(12) United States Patent
Rajakumar et al.

(10) Patent No.: US 8,924,285 B2
(45) Date of Patent: Dec. 30, 2014

(54) BUILDING WHITELISTS COMPRISING VOICEPRINTS NOT ASSOCIATED WITH FRAUD AND SCREENING CALLS USING A COMBINATION OF A WHITELIST AND BLACKLIST

(75) Inventors: Anthony Rajakumar, Fremont, CA (US); Richard Gutierrez, Mountain View, CA (US); Lisa M. Guerra, Los Altos, CA (US)

(73) Assignee: Verint Americas Inc., Alpharetta, GA (US)

( * ) Notice: Subject to any disclaimer, the term of this patent is extended or adjusted under 35 U.S.C. 154(b) by 867 days.

(21) Appl. No.: 12/352,530

(22) Filed: Jan. 12, 2009

(65) Prior Publication Data

US 2009/0119106 A1 May 7, 2009

Related U.S. Application Data

(63) Continuation-in-part of application No. 11/404,342, filed on Apr. 14, 2006.

(60) Provisional application No. 61/010,701, filed on Jan. 11, 2008, provisional application No. 61/197,848, filed on Oct. 31, 2008, provisional application No. 60/673,472, filed on Apr. 21, 2005.

(51) Int. Cl.
G06Q 40/00 (2012.01)

(52) U.S. Cl.
USPC ............................................ 705/38; 713/186

(58) Field of Classification Search
USPC ............................................................ 705/38
See application file for complete search history.

(56) References Cited

U.S. PATENT DOCUMENTS

| | | | |
|---|---|---|---|
| 4,653,097 A | 3/1987 | Watanabe et al. | |
| 5,805,674 A | 9/1998 | Anderson, Jr. | |
| 5,963,908 A | 10/1999 | Chadha | |
| 5,999,525 A | 12/1999 | Krishnaswamy et al. | |
| 6,044,382 A | 3/2000 | Martino | |
| 6,145,083 A * | 11/2000 | Shaffer et al. ..................... | 726/7 |
| 6,266,640 B1 | 7/2001 | Fromm | |
| 6,427,137 B2 | 7/2002 | Petrushin | |
| 6,510,415 B1 | 1/2003 | Talmor et al. | |

(Continued)

FOREIGN PATENT DOCUMENTS

| | | |
|---|---|---|
| EP | 0598469 A2 | 5/1994 |
| JP | 2006038955 | 9/2006 |

(Continued)

OTHER PUBLICATIONS

LougMiller, Collier; Message classification method in computer communications network, involves applying machine learning technique to recognize pattern of incoming messages, to classify messages; Mar. 2, 2005; Tumbleweed Comm Corp.*

(Continued)

*Primary Examiner* — Ella Colbert
*Assistant Examiner* — Michael Cranford
(74) *Attorney, Agent, or Firm* — Meunier Carlin & Curfman

(57) ABSTRACT

According to one aspect of the invention there is provided a method, comprising collecting voiceprints of callers; identifying which of the collected voiceprints are associated with fraud; and generating a whitelist comprising voiceprints corresponding to the collected voiceprints not identified as associated with fraud.

17 Claims, 11 Drawing Sheets

(56) References Cited

U.S. PATENT DOCUMENTS

| | | |
|---|---|---|
| 6,587,552 B1 | 7/2003 | Zimmermann |
| 7,039,951 B1 | 5/2006 | Chaudhari et al. |
| 7,212,613 B2 | 5/2007 | Kim et al. |
| 7,386,105 B2 | 6/2008 | Wasserblat |
| 7,539,290 B2* | 5/2009 | Ortel ............ 379/88.02 |
| 7,657,431 B2 | 2/2010 | Hayakawa |
| 7,668,769 B2 | 2/2010 | Baker et al. |
| 7,778,832 B2 | 8/2010 | Broman et al. |
| 7,822,605 B2 | 10/2010 | Zigel et al. |
| 7,908,645 B2 | 3/2011 | Varghese et al. |
| 7,940,897 B2 | 5/2011 | Khor et al. |
| 8,036,892 B2 | 10/2011 | Broman et al. |
| 8,112,278 B2 | 2/2012 | Burke |
| 2001/0026632 A1 | 10/2001 | Tamai |
| 2002/0099649 A1 | 7/2002 | Lee et al. |
| 2003/0208684 A1* | 11/2003 | Camacho et al. ........ 713/186 |
| 2004/0029087 A1 | 2/2004 | White |
| 2004/0131160 A1 | 7/2004 | Mardirossian |
| 2004/0240631 A1 | 12/2004 | Broman et al. |
| 2005/0043014 A1* | 2/2005 | Hodge ............ 455/411 |
| 2005/0125226 A1* | 6/2005 | Magee ............ 704/246 |
| 2005/0125339 A1 | 6/2005 | Tidwell et al. |
| 2005/0185779 A1 | 8/2005 | Toms |
| 2006/0106605 A1 | 5/2006 | Saunders et al. |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0282660 A1* | 12/2006 | Varghese et al. ........ 713/155 |
| 2006/0289622 A1 | 12/2006 | Khor et al. |
| 2006/0293891 A1 | 12/2006 | Pathuel |
| 2007/0041517 A1* | 2/2007 | Clarke et al. ............ 379/67.1 |
| 2007/0074021 A1 | 3/2007 | Smithies et al. |
| 2007/0280436 A1 | 12/2007 | Rajakumar |
| 2007/0282605 A1 | 12/2007 | Rajakumar |
| 2008/0010066 A1 | 1/2008 | Broman et al. |
| 2008/0195387 A1 | 8/2008 | Zigel et al. |
| 2009/0046841 A1 | 2/2009 | Hodge |
| 2009/0119106 A1 | 5/2009 | Rajakumar et al. |
| 2009/0147939 A1 | 6/2009 | Morganstein et al. |
| 2009/0254971 A1 | 10/2009 | Herz et al. |
| 2010/0228656 A1 | 9/2010 | Wasserblat et al. |
| 2010/0303211 A1 | 12/2010 | Hartig |
| 2010/0305946 A1 | 12/2010 | Gutierrez |
| 2010/0305960 A1 | 12/2010 | Gutierrez |
| 2011/0191106 A1 | 8/2011 | Khor et al. |
| 2011/0255676 A1 | 10/2011 | Marchand et al. |
| 2012/0072453 A1 | 3/2012 | Guerra et al. |
| 2012/0253805 A1 | 10/2012 | Rajakumar et al. |
| 2012/0263285 A1 | 10/2012 | Rajakumar et al. |
| 2013/0253919 A1 | 9/2013 | Gutierrez et al. |

FOREIGN PATENT DOCUMENTS

| | | |
|---|---|---|
| WO | 0077772 | 12/2000 |
| WO | 2006/013555 | 2/2006 |
| WO | 2007/001452 | 1/2007 |

OTHER PUBLICATIONS

Goodman J; Junk mail filtering system for laptop computer, employs new filter if new false poistive rate and negative rate are better than false positive and negative rate of seed filter; Jun. 3, 2004;.*

Majima S Goshi; Conten transmisiosn method of content authentication system, involves applying hash function to extracted feature value of content to obtain hash value which is enciphered to obtain content authentication data; Apr. 7, 2004.*

* cited by examiner

BUILDING WHITELISTS COMPRISING VOICEPRINTS NOT ASSOCIATED WITH FRAUD AND SCREENING CALLS USING A COMBINATION OF A WHITELIST AND BLACKLIST

RELATED APPLICATIONS

This application is a continuation-in-part of U.S. Ser. No. 11/404,342 filed Apr. 14, 2006, which in turn claims the benefit of U.S. Provisional Patent Application Ser. No. 60/673,472, titled "Detecting fraudulent use of financial account numbers using voiceprints" and filed Apr. 21, 2005. This application claims the benefit of priority to U.S. 61/010, 791, filed Jan. 11, 2008, the entire specification of which is hereby incorporated herein by reference and to U.S. 61/197, 848, filed Oct. 31, 2008, the entire specification of which is hereby incorporated herein by reference.

FIELD

Embodiments of the invention relate to a method and system to detect fraud such as credit card fraud.

BACKGROUND

Modern merchants are susceptible to many forms of fraud, but one form that is particularly pernicious is credit card fraud. With credit card fraud, a fraudster fraudulently uses a credit card or credit card number of another to enter into a transaction for goods or services with a merchant. The merchant provides the goods or services, but since the transaction is with the fraudster the merchant runs the risk of not getting paid. Another form of fraud that is very difficult for merchants, particularly large merchants, to detect, if at all, occurs in the job application process where an applicant has been designated as undesirable in the past—perhaps as a result of having been fired from the employ of the merchant at one location or for failing a criminal background check—fraudulently assumes a different identity and then applies for a job with the same merchant at a different location. In such cases, failure to detect the fraud could result in the rehiring of the fraudster to the detriment of the merchant. If the fraudster has assumed a new identity, background checks based on identity factors such as names or social security numbers become essentially useless. For example consider that case of a large chain store, such as, for example, Walmart. In this case, an employee can be terminated for say theft at one location, but then rehired under a different identity at another location. The employee represents a grave security risk to the company particularly since the employee, being familiar with the company's systems and internal procedures will be able to engage in further conduct injurious to the company.

SUMMARY

According to one aspect of the invention there is provided a method, comprising collecting voiceprints of callers; identifying which of the collected voiceprints are associated with fraud; and generating a whitelist comprising voiceprints corresponding to the collected voiceprints not identified as associated with fraud.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art, that the invention may be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention at least reduce losses due to fraudulent transactions, such as for example, credit card transactions by using voice data to identify fraudsters.

Figure 1:
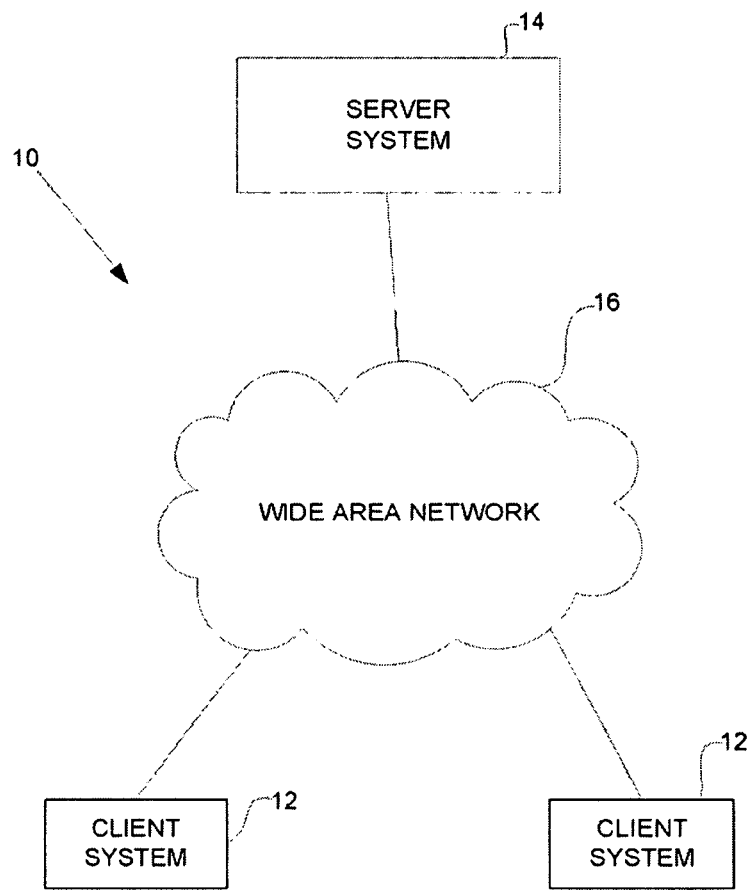
FIG. 1 shows a system within which embodiments of the invention may be practiced.

Embodiments of the invention will be described with reference to FIG. 1 of the drawings, which shows a system 10 in accordance with one embodiment of the invention. As will be seen, the system 10 includes a client system 12 which is coupled to a server system 14 via an intermediate Wide Area Network (WAN) 16, which may for example comprise the Internet.

Figure 2:
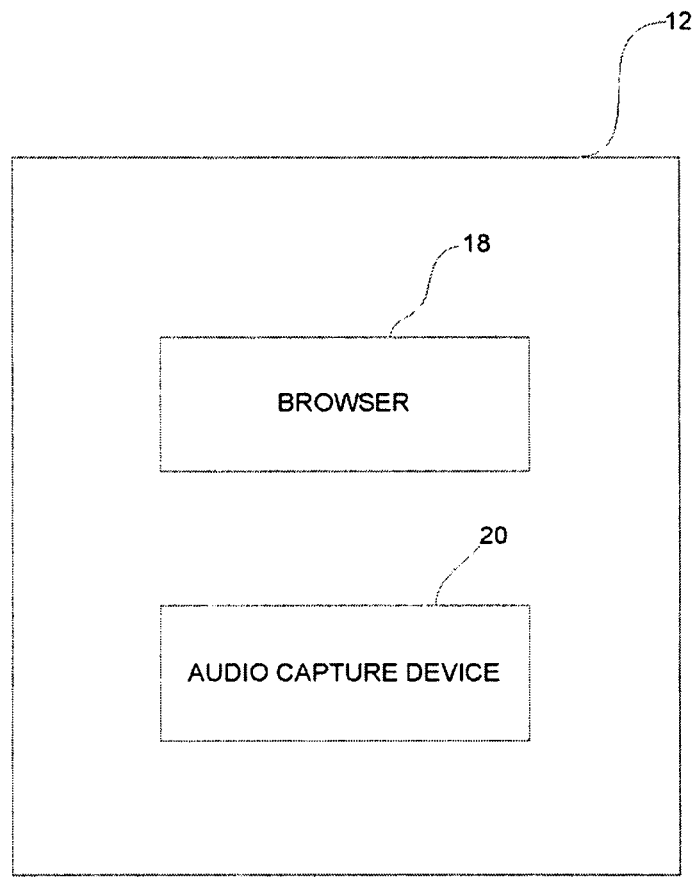
FIG. 2 shows a client system, in accordance with one embodiment of the invention.

In accordance with embodiments of the invention, the client system 12 may be located on client premises, for example the premises of a merchant. In one embodiment the client system 12 may be a distributed system that includes components that are not all located at a single location, but instead are distributed over multiple locations. As will be seen from FIG. 2 of the drawings, the client system 12 may include software to facilitate communications with the server system 14. In one embodiment the software may include a browser 18 which is an application that facilitates communications via the Wide Area Network (WAN) 16 with the server system 14 using networking protocols such as for example the Hypertext Transfer Protocol (HTTP)/the Internet Protocol (IP), the Simple Object Access Protocol (SOAP), etc. The client system 12 may also include audio capture device 20 may include any device capable of capturing audio such, as for example, a microphone, a telephone, etc. In one embodiment, the audio capture device 20 may be configured to transmit audio to the server system 14 via a secure connection establish using the network 16. An example of such a secure connection may include a Virtual Private Network (VPN) over the public Internet.

Figure 3:
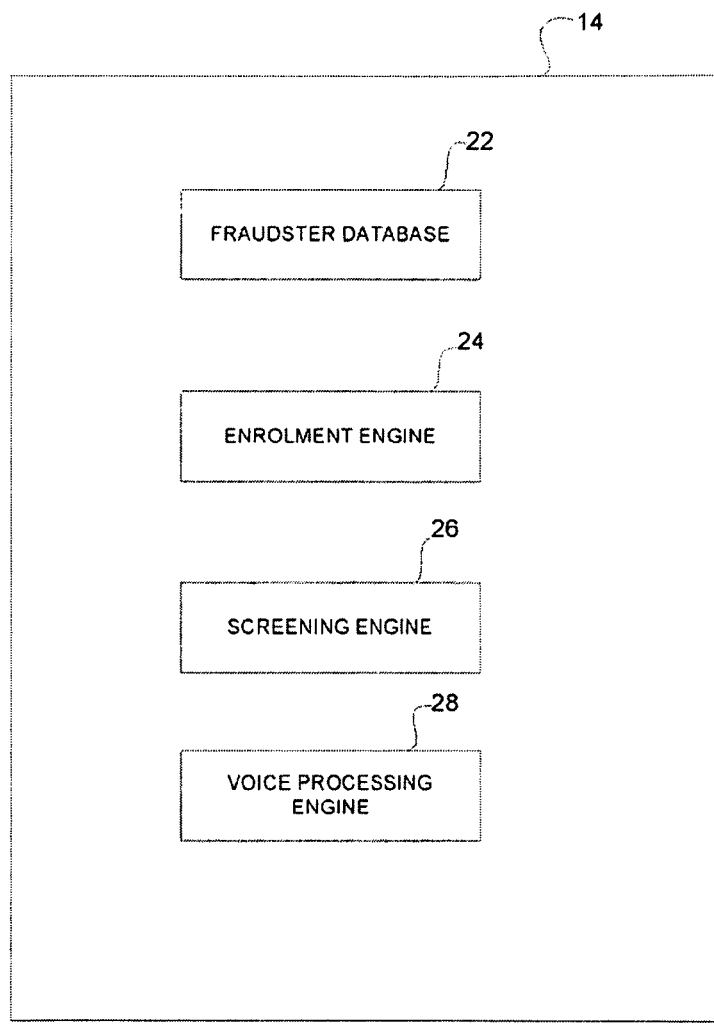
FIG. 3 shows a server system, in accordance with one embodiment of the invention.

FIG. 3 of the drawings shows a high level block diagram of the server system 14, in accordance with one embodiment of the invention. As will be seen, the server system 14 includes a fraudster database 22, an enrolment engine 24, a screening engine 26, and a voice processing engine 28. Each of the components 22 to 28 may be implemented in hardware or in software or as a combination of both hardware and software. Further, it is to be understood that while the components 22-28 are shown as separate components based on function, in reality some or all the components may be integrated.

The fraudster database 22 includes voice signatures or voice prints of known fraudsters. Essentially, a voice signature or print includes a set of voice characteristics that uniquely identify a person's voice. In one embodiment, each voice signature in the fraudster database 22 is assigned a unique identifier (ID); which in accordance with one embodiment may include a social security number for the fraudster, or a credit card number linked to the fraudster, as will be described later. Briefly, the enrolment engine 24 performs operations necessary to enroll voice signatures of known fraudsters into the fraudster database 22. The screening engine 26 receives requests from the client system 12 to screen a potential fraudster. In response to such requests, the screening engine 26 performs a screening operation and returns a result of the screening operation to the client system 12. In one embodiment, the voice processing engine 28 implements voice processing algorithms that are used by the enrolment engine 24, and the screening engine 26 in the performance of their respective functions, as will be described below.

Figure 4:
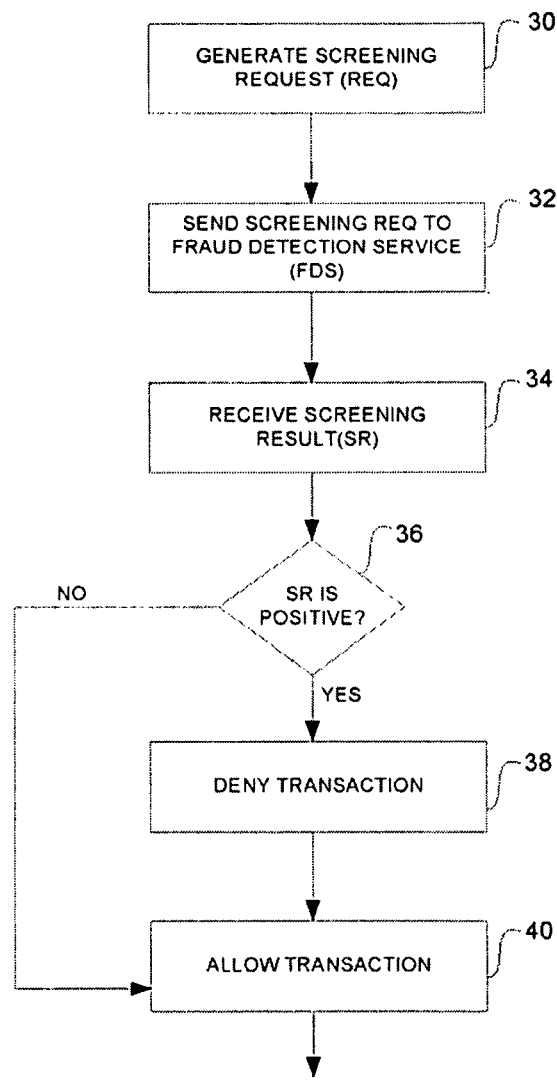
FIG. 4 shows a flowchart of operations performed by the client system of FIG. 2, in accordance with one embodiment of the invention.

Turning now to FIG. 4 of the drawings, there is shown a flowchart of operations performed by the client system 12, in accordance with one embodiment of the invention. Starting at block 30, the client system generates a screening request (REQ). The screening request (REQ) is to screen a potential fraudster. For example, the client system 12 may be installed on the premises of a retail merchant who may be either a traditional retail merchant with brick and mortar facilities, or an online retail merchant. The retail merchant may be processing a credit card transaction and the screening request generated at 30 is to screen, for example, a purchaser who initiated the credit card transaction so that the credit card transaction may be denied if it turns out that the purchaser is a fraudster. It is to be noted that use of the client system 12 to detect credit card fraud is intended ohly to be illustrative of how embodiments of the present invention may be used to detect fraud based on voice data. To further the reader's understanding of how embodiments of the present invention may be used to detect fraud, in a second example, the client system 12 may be that of a large nationwide retailer, for example Walmart. In this case, instead of using the client system 12 to detect credit card fraud, the retailer may use the client system 12 as part of a screening process to verify the identity of, say, a job applicant. With regard to the second application, the reader is requested to bear in mind the risks, described in the background section of this application, associated with a retailer in the event of not being able to successfully verify the identity of a job applicant.

Continuing with FIG. 4 of the drawings, at block 32 the client system 12 sends the screening request to the server system 14 which in effect implements a fraud detection service (FDS). At block 34, a result of the screening is received from the server system 14 at block 36, the client system 12 determines if the screening result is positive as will be the case if the job applicant, or the purchaser is a fraudster, in which case at block 38, the transaction (for example a purchasing transaction, or job application) is denied. If at block 36 it is determined that the screening result is negative then control passes to block 40, where the transaction is allowed. Thus, in broad terms, the techniques and systems disclosed herein may be used to disqualify candidates from further participation in a transaction such as a credit card transaction or a job application. In accordance with different embodiments of the invention there may be differences in how a transaction is processed. In some cases the merchant may charge a credit or debit card before the screening result is available. For this case if it turns out that the screening result is positive then the merchant may not ship any goods that may have been purchased. In another embodiment, a credit or debit card is only charged if the screening result is negative. It is important to appreciate at least some, if not all of the operations described with reference to FIG. 4 of the drawings, may be implemented as business logic or rules executing on the client system 12.

Figure 5:
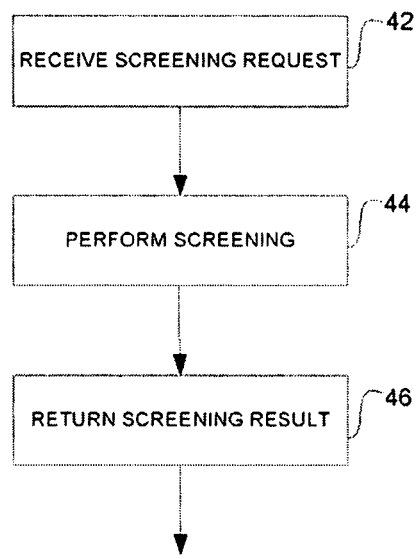
FIG. 5 shows a flowchart for a screening process performed by the server system of FIG. 3, in accordance with one embodiment of the invention.

FIG. 5 of the drawing shows a flowchart of operations performed by the server system 14, in accordance with one embodiment of the invention. As will be seen, at block 42, the server system 14 receives the screening request from the client system 12. The screening request is screen a candidate for example a purchaser or a job applicant. At block 44, the server system 14 performs a screening operation based on the request. In one embodiment, the screening operation may include initiating a telephone call to the candidate in order to collect a voice sample for the candidate. The telephone call may be initiated by a live operator or by an automated system. Advantageously, in one embodiment, a series of innocuous questions are posed to the candidate during the telephone call so that the candidate does not suspect that the actual purpose of the call is to collect a voice sample. In one embodiment, the questions may be designed to obtain the candidate's name, credit card number, social security number, etc. In one embodiment the telephone call may be initiated by the candidate. For example, in the case of the candidate being a job applicant, the candidate may be given a telephone number to call. For greater flexibility, in one embodiment screening requests are assigned a unique screening identifier (ID) to be used to identify screening requests made to the server system 14. By using the screening ID, telephone calls can be linked to the appropriate screening request. For example, if a call to a candidate fails for some reason, the screening ID may be provided to the candidate via the merchant so that the when the candidate calls to provide a voice sample, the server system 14 can link the call to a particular screening request based on the screening ID. Once a voice sample for the candidate is obtained, the voice sample is compared to voice signatures in the fraudster database 22. At block 46, the server system 14 returns a screening result to the client system 12, via the intermediate wide area network 16.

Figure 6:
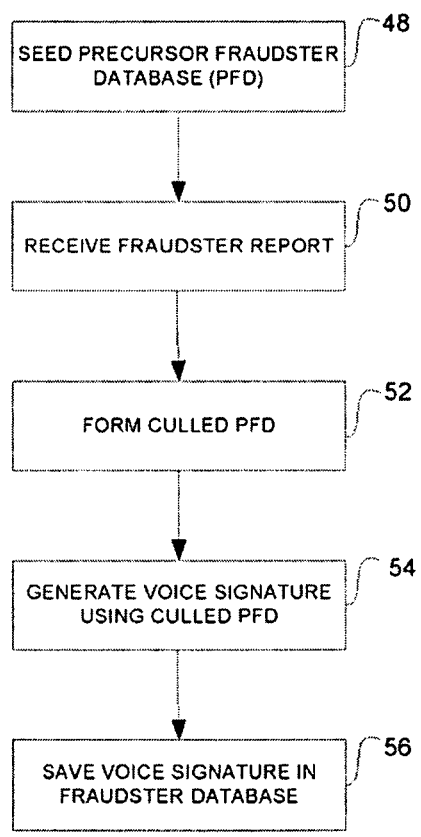
FIG. 6 shows a flowchart for an enrolment operation performed by the server system of FIG. 3, in accordance with one embodiment of the invention.
Figure 7:
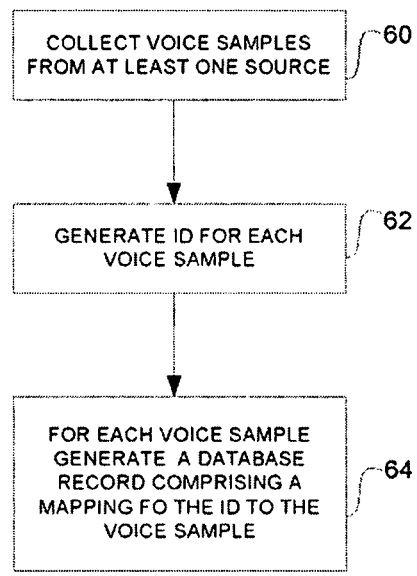
FIG. 7 shows a flowchart operations performed by the server system of FIG. 3 in order to seed a precursor fraudster database, in accordance with one embodiment of the invention.

In one embodiment, the enrolment engine 24 of the server system 14 performs an enrolment operation, as shown in the flowchart of FIG. 6. Turning to FIG. 6, the enrolment operation includes a block 48 where a precursor fraudster database (PFD) is seeded or populated. FIG. 7 of the drawings shows a flowchart of operations performed at block 48 to seed the precursor database in accordance with one embodiment of the invention. As will be seen, at block 60, voice samples from at least one source, for example a merchant or vendor, are collected. The voice samples are collected without regard as to whether they are fraudulent or not. In one embodiment, collecting the voice samples includes operations similar to the operations of block 44 described above where a call is initiated to the candidate or the candidate is asked to call. At block 62, a unique identifier (ID) is generated for each voice sample. The unique identifier (ID) may be generated using speech recognition techniques, human transcription, or by a combination of speech recognition techniques and human transcription. In one embodiment, the unique identifier (ID) may be a credit card number embedded in the voice sample. At block 64, a database record is generated for each voice sample. The database record comprises a mapping of the unique ID to the voice sample. It will be appreciated, that as a result of the seeding operation performed at block 48, the precursor fraudster database (PFD) will include a large number of voice samples, without any information as to which of these samples belong to fraudsters. Thus, one goal of the enrollment operation performed by the enrollment engine 24 is to form a subset of voice samples from the precursor fraudster database (PFD), wherein the subset only contains voice samples known to belong to fraudsters. For ease of reference, such a subset of voice samples will be referred to as the "culled precursor fraudster database (PFD)". Continuing with FIG. 6, at block 50, a fraudster report is received from a merchant. In one embodiment, the fraudster report may be received from the client system 12 via the wide area network 16. In essence, the fraudster report includes information, such as, for example, credit card numbers known to have been used fraudulently, or social security numbers associated with instances of fraud, etc. In one embodiment, the fraudster report is received periodically from the merchant.

Figure 8:
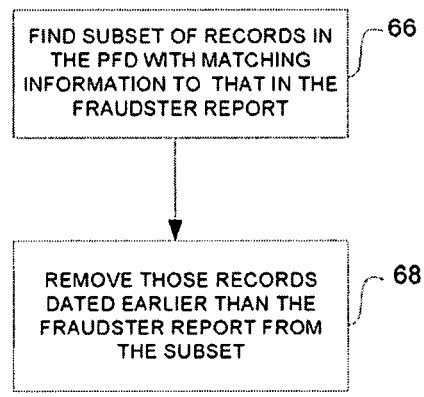
FIG. 8 shows a flowchart of operations performed by the server system of FIG. 3 in order to cull the precursor fraudster database, in accordance with one embodiment of the invention.

At block 52, the culled precursor fraudster database (PFD) is generated or formed. The particular operations performed in order to form the culled precursor database (PFD), in accordance with one embodiment, is shown in the flowchart of FIG. 8. As will be seen, at block 66 the enrollment engine 24 finds a subset of records in the precursor database (PFD) with matching information to that in the fraudster report. For example, consider the case where the voice samples in the precursor fraudster database (PFD) contains information relating to a credit card transaction. In this case the operations at block 66, include searching the precursor fraudster database (PFD) for those voice samples that include a credit card number that matches a credit card number appearing in the fraudster report.

At block 68, the subset of records determined at block 66, is further reduced by removing those records dated earlier than the fraudster report from the subset. The operation at block 68 is performed so that voice samples belonging to non-fraudsters do not form part of the subset or culled precursor database (PFD). By virtue of the operations performed in the flowchart of FIG. 8, it will be appreciated that the culled PFD includes only the voice samples of known fraudsters.

Figure 9:
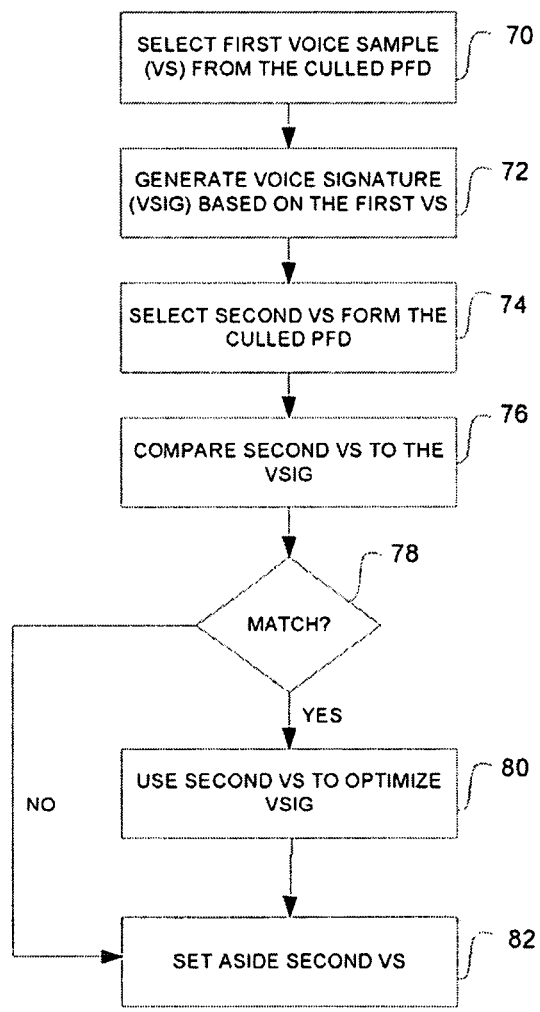
FIG. 9 shows a flowchart of operations performed by the server system of FIG. 3 in order generate a voice signature, in accordance with one embodiment of the invention.

Continuing with FIG. 6, at block 54, voice signatures are generated using the culled PFD. Turning now to FIG. 9 of the drawings, there is shown a flowchart of operations performed, in accordance with one embodiment of the invention, in order to generate the voice signatures at block 54. As will be seen, at block 70, a first voice selection. At block 72, using the voice processing engine 28, a voice signature (VSIG) based on the first voice sample is generated. At block 74, a second voice sample from the culled PFD is selected. Thereafter, at block 76, the second voice sample is compared to the voice signature (VSIG) that was generated based on the first voice signature.

At block 78, if the second voice sample matches the voice signature then control passes to block 80, otherwise control passes to block 82. At block 80, the second voice sample is used to train or optimize the voice signature. At block 82, the second voice sample is set aside, in other words it is not considered in the training of the voice signature. In one embodiment, the operations 70 to 82 are performed until a predefined number of fraudulent voice signatures are generated. In one embodiment, the voice samples that were set aside at block 82 are considered to form a separate subset and the operations 70 to 82 are performed on this separate subset. Thus, several voice signatures may emerge as a result of the repeated performance of the steps 70 to 82, of FIG. 9.

Continuing with FIG. 6 of the drawings, at block 56, the voice signatures that were generated as per the flowchart of FIG. 9 are saved in a fraudster database.

It will be appreciated that once the fraudster database 22 is constructed in accordance with the above described techniques, performing the screening operation at block 44 can be achieved by comparing against the voice signatures in the fraudster database in order to find a match, which would be indicative of a fraudster.

The foregoing described how the fraudster report may be used to disqualify a candidate attempting to complete a transaction such as a credit card transaction or purchase. It is to be appreciated that the techniques described herein may be used to disqualify candidates from other types of transaction such a, for example, a debit card transaction.

For the employment verification case the fraudster report is generated by an employer, who designates disqualified or undesirable candidates using a unique identifier for the candidate, such as for example, a social security number for the candidate. Candidates may become undesirable because of, for example, a failed background check or because they were fired.

In one embodiment, the voice samples in the precursor fraudster database (PFD) may be used to generate a list of legitimate or non-fraudulent users. The list may be stored in a database which for ease of reference is referred to herein as "the whitelist database", whereas the fraudster database will be referred to as "the blacklist database". For example, in one embodiment, the voice samples that have not been culled after a predefined period are treated as being legitimate voice samples that are not associated with fraud. These legitimate voice samples may then be enrolled into the whitelist database. In another embodiment, transaction data may be received from third parties such as merchants or credit card issuers and linked to voice samples in the PFD. The voice samples that are linked to a threshold number of good or non-fraudulent transactions based on the transaction data is then regarded as not being associated with fraud and thus moved to the whitelist database.

In accordance with one embodiment of the invention, the whitelist database may be used to process an incoming screening request (REQ) thereby to identify a person uniquely or at least partially. For this embodiment, the REQ includes an element or a combination of elements (also referred to herein as "metadata") that serve as a proxy to identify a person, Examples of metadata include a person's social security number or the combination of a person's name and address or the person's account number. The metadata defines the unique ID associated with each voiceprint in the whitelist database. This allows elements in a REQ serving as a proxy to identify a person to be matched against the IDs in the whitelist database.

It will be appreciated that advantageously, screening requests (REQs) may be screened against the whitelist database thereby to authenticate a customer/caller.

There is the possibility that a voiceprint enrolled in the whitelist database may become associated with fraud in the future. For example, a legitimate customer may subsequently turn to fraud. Alternatively, a fraudster may deliberately use a stolen identity to enroll their voice into the whitelist database with a view to engaging in future fraud. In either case, if the system subsequently determines that a person in the whitelist database has now become a fraudster, the person's voiceprint in the whitelist database is removed or at least flagged as associated with fraud and inserted into the blacklist fraudster database. This determination can be made by scanning incoming fraud reports and determining which of those reports are linked to prior screenings that matched entries in the whitelist database.

The choice of whether to screen a REQ against the blacklist database or the whitelist database is the prerogative of an entity (e.g. merchant or credit card issuer) making the REQ. In one embodiment, both the fraudster database and the whitelist database may be used to process a REQ as will be now described with reference to FIG. 10 of the drawings.

Figure 10:
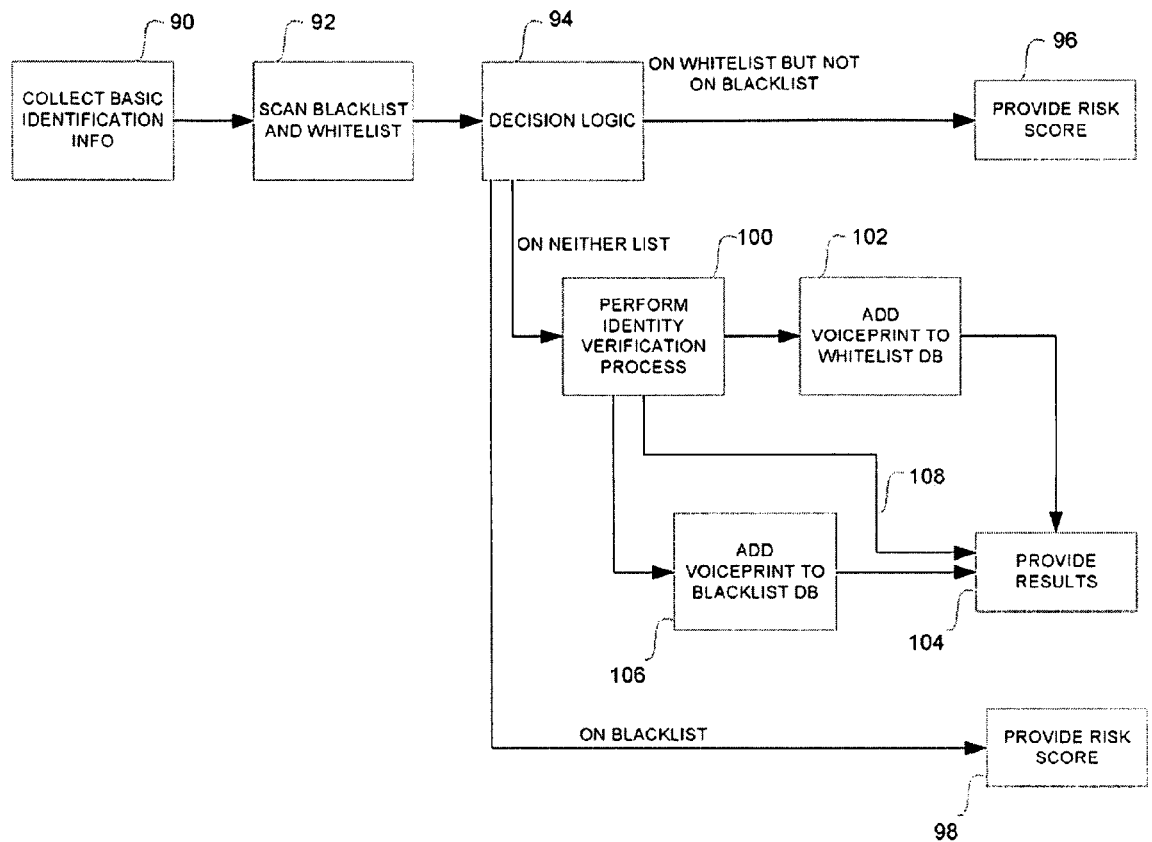
FIG. 10 shows a flowchart of a screening process using a blacklist and a whitelist in accordance with one embodiment of the invention.

FIG. 10, shows a flowchart of operations performing to process a REQ from a requesting entity such as a merchant or credit card issuer, using both the fraudster database and the whitelist database, in accordance with one embodiment of the invention. Referring to the figure, at block 90, basic identification information is collected. Examples of basic identification information include a user's name, address, phone number, account number, etc. This information may be collected in a number of ways including: a) manually by an agent, b) automatically by a computer program (automated speech application, speech/dtmf application, and/or web), or c) some combination of a) and b) The collection process performed in a number of ways including: a) over the phone, b) in person, c) over the web, or d) some combination of a), b) and c).

At block 92 the blacklist and the whitelist databases are scanned for voiceprints with matching metadata. Decision logic 94 controls how the results of the scanning are handled. In one embodiment. If there is a matching voiceprint on the whitelist database then a risk score indicative of a low fraud risk is provided to the requesting entity at block 96. If there is a matching voiceprint on the blacklist, then a risk score indicative of a high fraud risk is provided to the requesting entity at block 98. If there are no matching voiceprints either in the whitelist database or in the blacklist database, then an identity verification process is performed at block 100. The identity verification process is a process that is performed to determine whether the user is who they claim to be (as opposed to an imposter). In one embodiment, identity verification involves asking the user questions that only they are likely to know. These are referred to as "out-of-wallet" questions, and include questions such as:

where did you go to high school?
what was the make of the first car you owned?
Which of the following addresses have you previously lived at.
What city were you born in?, etc.

In one embodiment, if a caller passes the identity verification process 100, then the user's voiceprint is added to the whitelist database at block 102, and the result of the identity verification process is provided to the requesting entity at block 104. Failure to pass the authentication verification process 100 can be because of fraud or perhaps because the caller has a faulty memory and therefore was not able to answer all the out-of wallet questions correctly. In accordance with one embodiment, failure to pass the identity verification process 102 leads to the optional addition of the user's voiceprint to the blacklist database 106 at block 106. In another embodiment, instead of adding the user's voiceprint to the blacklist database at block 106, path 108 execute which leads to block 104 where the results of the authentication verification process 100 are reported to the requesting entity.

A text-based blacklist database may be derived from the voiceprint-based detection of a fraudster described herein. This may be done by noting the metadata associated with the fraudster screening. When a voiceprint screening is requested, textual data may be submitted as part of the screening. If a fraudster is identified through their voice, the associated metadata is added to the text-based blacklist. Fraudsters may also be added to the text-based blacklist based on fraud reports that are submitted to the voiceprint-based system. Examples of such data include: a phone number or any elements provided by the putative fraudster that is associated with the transaction being screened. Without limitation, some examples are the name used by the fraudster for the attempt, the credit card data used, the identity information used (for example, the social security number), etc.

The text-based blacklist so derived may then be used in the following ways:

(a) Using a voiceprint-derived text-based blacklist, the accuracy of the voice printing process can be enhanced. This is done by noting the associated metadata (examples described above) submitted for a subsequent voiceprint screening, and looking for matches of one or more elements of the associated information with one or more elements of the information in the blacklist. If one or more matches is found, the original voiceprint(s) associated with the information in the text-based blacklist is screened against the audio data of the subsequent screening. This may be in conjunction with or instead of other mechanisms for selecting the voiceprints to scan against the incoming audio data for the current screen.

(b) Using a voiceprint-derived text-based blacklist, processes around credit granting, account initiation or order acceptance can be improved. For example, the voiceprint-derived text-based blacklist generated as above or a risk score derived therefrom is shared in whole or in part to credit card issuers, merchants, etc. This text-based blacklist or score derived therefrom is then used to evaluate account openings, transaction patterns or merchant transactions for fraud risk. The risk score may, as an example, take into consideration the number of elements that match between the metadata in the screening REQ and the elements stored in the blacklist.

(c) Using either a voiceprint-derived text-based blacklist or the voiceprint-based blacklist, consumers could be notified when their identities or financial information such as credit cards are being misused by a fraudster. Consumers would sign up for an alert service by providing their identity (e.g. one or more of their name, social security number, address or phone number) or financial information (e.g. account numbers, credit card numbers, etc.). They are then alerted when one or more elements of their identity or financial information is associated with fraud. Examples of such misuse are when another person uses their social security number or their credit cards without their authorization.

Figure 11:
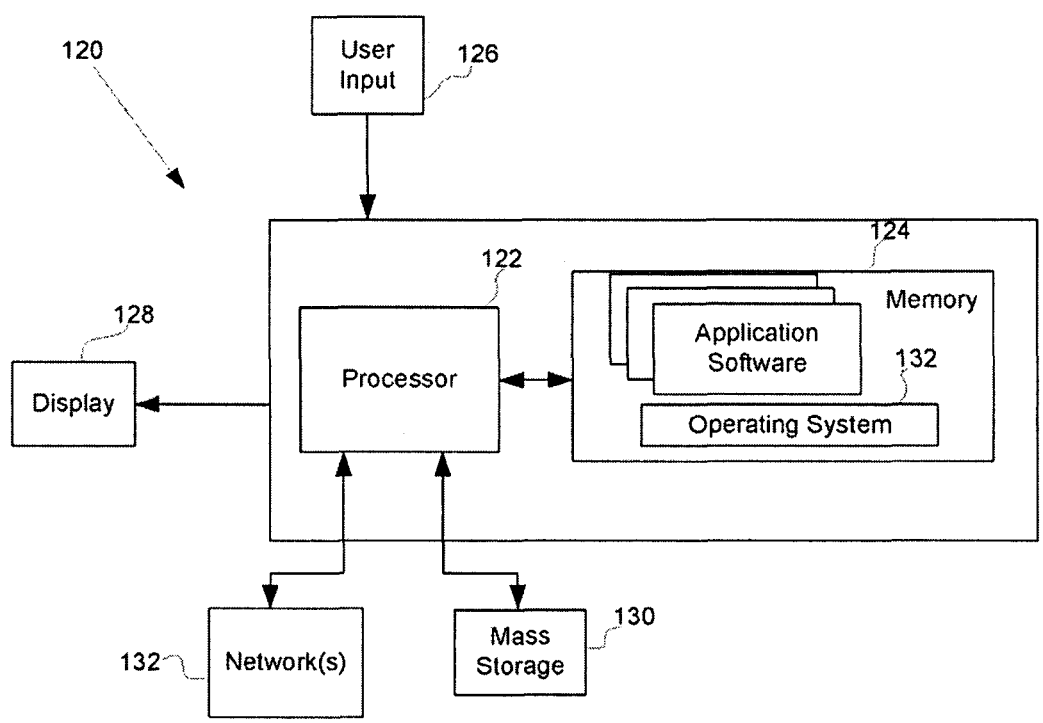
FIG. 11 shows an example of hardware that might be used to implement any of the client and server systems of the present invention.

The client system 12 and the server system 14 have, thus far, been described in terms of their respective functions. By way of example, each of the client and server systems of the present invention may be implemented using the hardware 120 of FIG. 11. The hardware 120 typically includes at least one processor 122 coupled to a memory 124. The processor 122 may represent one or more processors (e.g., microprocessors), and the memory 124 may represent random access memory (RAM) devices comprising a main storage of the system 120, as well as any supplemental levels of memory e.g., cache memories, non-volatile or back-up memories (e.g. programmable or flash memories), read-only memories, etc. In addition, the memory 124 may be considered to include memory storage physically located elsewhere in the system 120, e.g. any cache memory in the processor 122, as well as any storage capacity used as a virtual memory, e.g., as stored on a mass storage device 130.

The system 120 also typically receives a number of inputs and outputs for communicating information externally. For interface with a user or operator, the system 120 may include one or more user input devices 126 (e.g., a keyboard, a mouse, etc.) and a display 128 (e.g., a Liquid Crystal Display (LCD) panel).

For additional storage, the system 120 may also include one or more mass storage devices 130, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 120 may include an interface with one or more networks 132 (e.g., a local area network (LAN), a wide area network (WAN), a wireless network, and/or the Internet among others) to permit the communication of information with other computers coupled to the networks. It should be appreciated that the system 120 typically includes suitable analog and/or digital interfaces between the processor 122 and each of the components 94, 96, 98 and 102 as is well known in the art.

The system 120 operates under the control of an operating system 132, and executes various computer software applications, components, programs, objects, modules, etc. to perform the respective functions of the client and server systems of the present invention. Moreover, various applications, components, programs, objects, etc. may also execute on one or more processors in another computer coupled to the system 90 via a network 132, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

One advantage of the techniques and systems described herein is that fraud detection is base on a fraudster's voice, which being biometric in nature is linked to the fraudster. This is in contrast with techniques that use parametric information such, for example, lists of stolen credit cards to control fraud. It will be appreciated that the embodiments of the present invention will enable fraud detection even in cases where the theft or loss of a credit card had not been reported.

What is claimed is:

1. A method comprising:
   receiving precursor data comprising a plurality of identifiers and voice samples, each identifier associated with a voice sample, the precursor data received without regard to whether the voice samples are fraudulent or not, the receiving performed using a server system including a computer having a processor coupled to memory;
   receiving a fraud report comprising a plurality of identifiers associated with fraud;
   identifying using the server system which of the precursor data are associated with fraud based on a match between identifiers associated with the voice samples and the identifiers associated with fraud in the fraud report;
   generating a blacklist comprising a list of voice prints based on the voice samples corresponding to the identified precursor data associated with fraud using the server system;
   generating a whitelist comprising a list of voice prints based on voice samples not corresponding to the identified precursor data associated with fraud using the server system; and
   processing requests to screen voice samples of speakers against voice prints in one of the blacklist and the whitelist.

2. The method of claim 1, further comprising indexing the received precursor data based on identification metadata that at least partially identifies a speaker associated with the data.

3. The method of claim 1, wherein the generating a whitelist comprises converting precursor data not identified as associated with fraud to a whitelist database of voiceprints.

4. The method of claim 3, wherein the conversion is performed only after effluxion of a predefined period of time, provided that no fraudulent transaction was linked to the precursor data during the predefined period.

5. The method of claim 1, wherein generating a whitelist comprising data corresponding to the precursor data not identified as associated with fraud is based on a number of non-fraudulent transactions linked to the precursor data exceeds a threshold.

6. A system comprising:
   a processor, and a memory coupled to the processor, the memory storing instructions which when executed by the processor cause the system to perform a method comprising:
   receiving precursor data, each entry in the precursor data comprising an identifier and a voice print associated with the identifier, the data received without regard to whether the voice print is associated with fraud;

identifying which of the voice print entries in the precursor data are associated with fraud, based on matching the associated identifiers to information in a fraud report;

generating a blacklist comprising the voice print entries in the precursor data associated with fraud;

generating a whitelist comprising data corresponding to identifiers and associated voice print entries in the precursor data not identified as associated with fraud and based on identifiers associated with non-fraudulent transactions; and processing requests to screen speakers against one of the blacklist and the whitelist.

7. The system of claim 6, wherein the method further comprises indexing the precursor data based on identification metadata that at least partially identifies a speaker associated with the data.

8. The system of claim 6, wherein the identifying comprises marking data associated with fraud if a fraudulent transaction can be linked to the data based on the fraud report.

9. The system of claim 6, wherein the generating comprises determining that a number of non-fraudulent transactions linked to the precursor data exceeds a threshold.

10. The system of claim 6, wherein the method further comprises generating a blacklist comprising voiceprints corresponding to precursor data identified as associated with fraud.

11. A non-transitory computer-readable storage medium having stored thereon a sequence of instructions which when executed by a machine, causes the machine to perform a method comprising:

collecting data comprising a plurality of identification metadata and for each of the identification metadata, a corresponding voiceprint;

comparing each of the collected identification metadata to fraud data in a fraud report;

identifying which of the compared identification metadata are associated with the fraud data;

generating a blacklist comprising a list of voiceprints corresponding to identification metadata that are identified as associated with fraud data;

generating a whitelist comprising a list of voiceprints corresponding to identification metadata that are not identified as associated with fraud data; and processing requests to screen speakers against one of the blacklist and the whitelist.

12. The computer-readable storage medium of claim 11, wherein the method further comprises indexing the collected data based on identification metadata that at least partially identifies a speaker associated with the data.

13. The computer-readable storage medium of claim 11, wherein the identifying comprises marking data associated with fraud if a fraudulent transaction can be linked to the voiceprint based on a fraud report.

14. The computer-readable storage medium of claim 13, wherein the generating a whitelist comprises saving each collected voiceprint not identified as associated with fraud to a whitelist database.

15. The computer-readable storage medium of claim 14, wherein the saving is performed only after effluxion of a predefined period of time after the collection of the collected voiceprint provided no fraudulent transaction was linked to the collected voiceprint during the predefined period.

16. The computer-readable storage medium of claim 14, wherein the saving is performed only after a number of non-fraudulent transactions linked to the collected voiceprint exceeds a threshold.

17. The computer-readable storage medium of claim 11, wherein the method further comprises generating a blacklist comprising data corresponding to the collected data identified as associated with fraud.

* * * * *